(12) United States Patent
Hofmann et al.

(10) Patent No.: US 7,178,413 B2
(45) Date of Patent: Feb. 20, 2007

(54) WHEEL BEARING WITH SENSORS

(75) Inventors: Heinrich Hofmann, Schweinfurt (DE); Jens Heim, Schweinfurt (DE); Peter Niebling, Bad Kissingen (DE); Horst Masuch, Schweinfurt (DE)

(73) Assignee: Fag Kugelfischer AG (DE)

( * ) Notice: Subject to any disclaimer, the term of this patent is extended or adjusted under 35 U.S.C. 154(b) by 535 days.

(21) Appl. No.: 10/603,287

(22) Filed: Jun. 24, 2003

(65) Prior Publication Data
US 2006/0037411 A1 Feb. 23, 2006

(30) Foreign Application Priority Data
Jun. 25, 2002 (DE) .................. 102 28 412

(51) Int. Cl.
*G01L 1/10* (2006.01)
*G01L 3/02* (2006.01)

(52) U.S. Cl. .................. 73/862.541; 73/862.332

(58) Field of Classification Search ........... 73/862.322, 73/862.541
See application file for complete search history.

(56) References Cited

U.S. PATENT DOCUMENTS 5,921,633 A * 7/1999 Neibling et al. .............. 301/6.1
6,634,208 B2 * 10/2003 Salou et al. ................ 73/11.07

* cited by examiner

*Primary Examiner*—Max Noori
(74) *Attorney, Agent, or Firm*—Ostrolenk, Faber, Gerb & Soffen, LLP

(57) ABSTRACT

Wheel bearing comprising a rotating part and a stationary flange, and rolling contact elements arranged between them. A brake caliper is supported on the stationary flange. At least one sensor is arranged on the stationary flange. The sensor measures the braking force by measuring the change in length in the material of the stationary flange in the flow of force between first fastening openings for receiving the brake caliper and a form-locking connecting element for connecting to a wheel carrier.

2 Claims, 3 Drawing Sheets

WHEEL BEARING WITH SENSORS

FIELD OF THE INVENTION

The invention relates to a wheel bearing with a brake caliper fitted and sensors for measuring the braking forces.

BACKGROUND OF THE INVENTION

Engineers have been working for many years on electronic vehicle control systems to improve the ride comfort and safety of motor vehicles. One link in this system is the wheel bearing, at which the wheel speed is measured and the vertical wheel forces between the tire and the road are continuously determined. These data are then made available to the vehicle control systems. EP 1176409 A1 discloses one such wheel bearing with the corresponding sensors. This wheel bearing provides the additional possibility of fastening the brake caliper directly to the stationary flange component to enable the forces that act on the wheel bearing during braking to be measured. The fixed flange of the wheel bearing is then fastened to the wheel carrier by a number of bolts. The problem with this arrangement or fastening is that the directions of force flow between the wheel carrier and the fixed flange component are not defined owing to the tightening of the bolts. The forces from the wheel bearing or from the brake caliper are thus transmitted to the wheel carrier "in some way or other". This unclear direction of force flow within the flange makes it more difficult to measure the braking forces.

OBJECT OF THE INVENTION

It is thus the object to provide a connection between the fixed flange of the wheel bearing and the wheel carrier which allows unambiguous association of the forces during braking.

DESCRIPTION OF THE INVENTION

This object is achieved by the invention.

The essence of the invention comprises at least one form-locking connecting element to direct the flow of force in the stationary part of the wheel bearing in a specific way during braking. For this purpose, projections, bolts or pins are provided in the immediate vicinity of the fastening openings for receiving the brake caliper. These form-locking connecting elements engage in recesses in the wheel carrier and transmit the braking torque to the wheel carrier in a defined manner. Since the exact point of introduction and point of transmission of these forces are known, the flow of force in the stationary flange of the wheel bearing can be stated in a defined way.

Sensors, which measure changes in length in the material of the stationary flange of the wheel bearing, can thus be arranged at a suitable point between the points of introduction and transmission of the braking force. The measured change in length is then converted to a braking force.

A further advantage of this distribution of the various points of introduction into the wheel carrier is that the wheel carrier can be further optimized in terms of its weight as a result of the precise points of introduction.

DETAILED DESCRIPTION OF THE PREFERRED EMBODIMENTS

Figure 1:
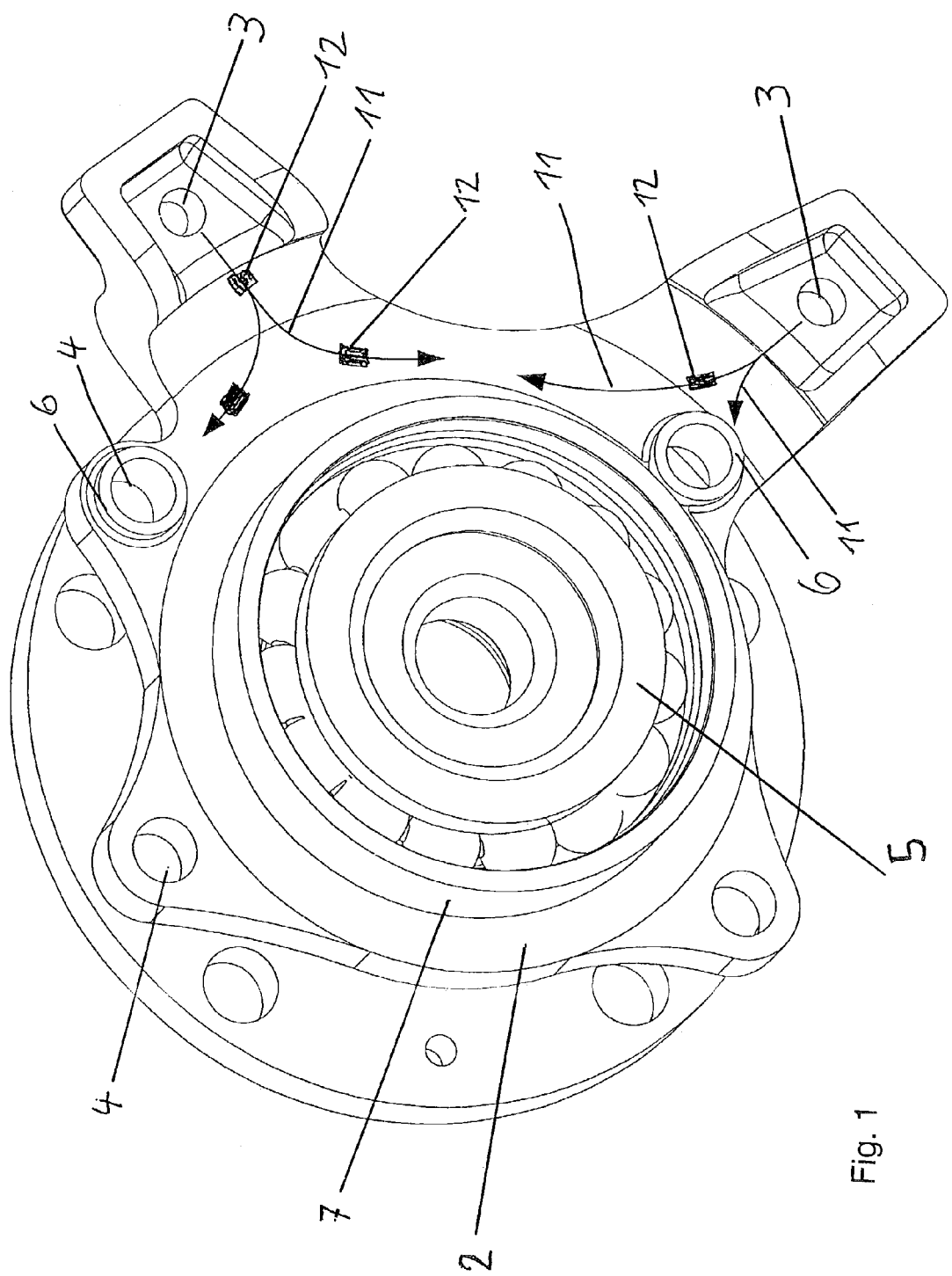
FIG. 1 is a perspective and plan view of a fixed flange of the wheel bearing.

FIG. 1 shows a fixed flange 2 of a wheel bearing. The brake caliper carrier (not shown) is fastened at the first openings 3 in the flange 2. The supporting forces for the brake caliper are thus introduced via the first openings 3.

The fixed flange 2 of the wheel bearing is connected to the wheel carrier or wheel rim via the second openings 4. Two of the illustrated second openings 4 have a respective annular protrusion 6. This annular protrusion 6 engages in a form-locking manner in a recess in the wheel carrier. Even one annular protrusion 6 would transmit the torque introduced via the first fastening openings 3 to the wheel carrier in a form-locking manner. An equivalent solution to that shown has the annular protrusions arranged in the wheel carrier which can engage in recesses in the fixed flange of the wheel bearing. This equivalent representation is not shown in the figures.

The arrows 11 represent the path of the forces between the first openings 3 (brake caliper receptacle) and the annular protrusion 6 during braking. Possible positions for the location of the sensors 12 along the line 11 of force flow are illustrated. The sensors 12 are intended to represent all sensors that can detect changes in length in materials.

Figure 2:
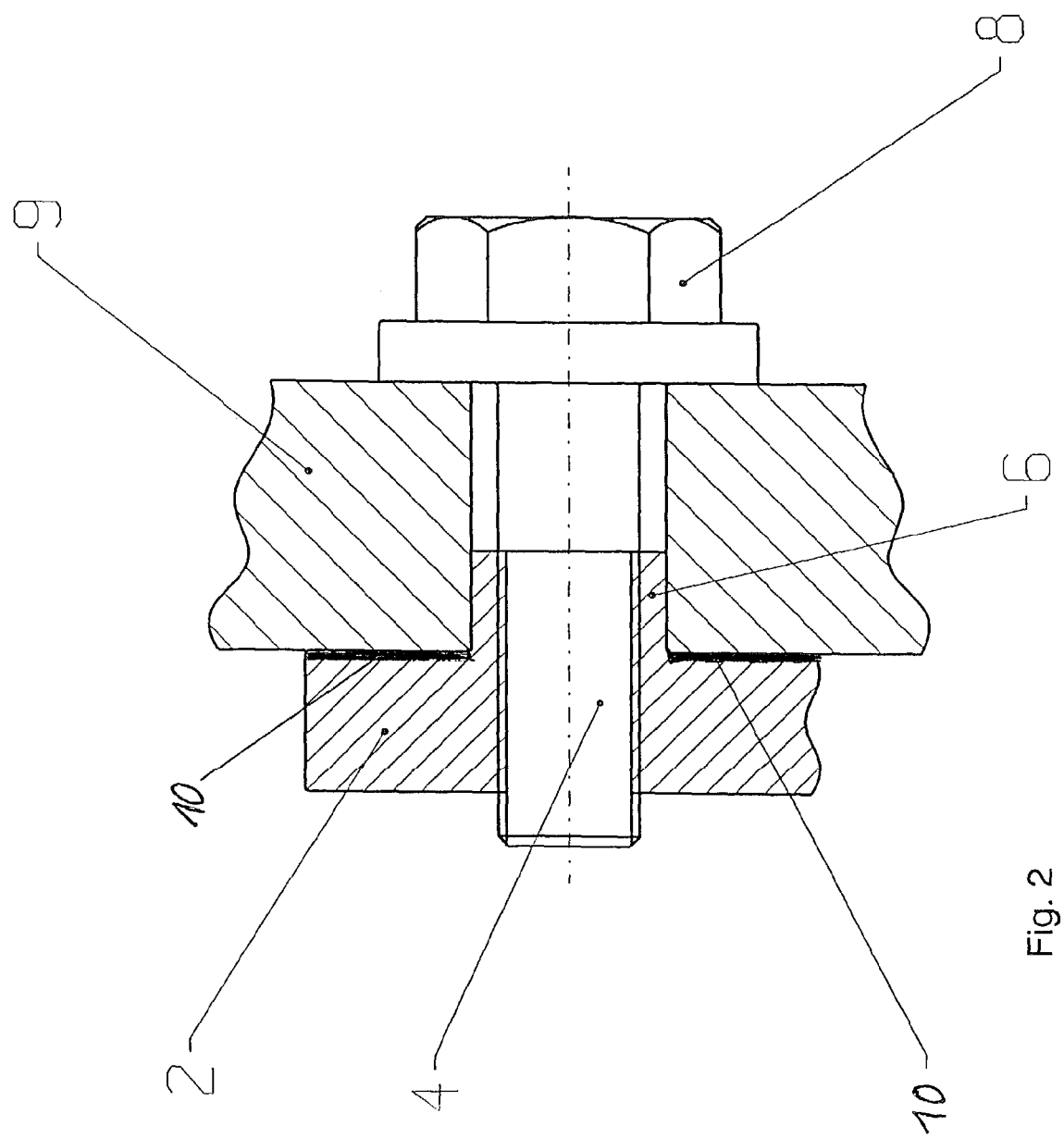
FIG. 2 shows a fragment of the fixed flange of the wheel bearing and the wheel carrier in section.

FIG. 2 shows a section through the fixed flange of the wheel carrier 2, a second opening 4 with an annular protrusion 6 being illustrated. The bolt 8 connects the wheel carrier 9 to the fixed flange of the wheel bearing 2.

An optional sliding layer 10 may be introduced between the wheel carrier 9 and the fixed flange of the wheel bearing. This sliding layer reduces the coefficient of friction between the wheel carrier 9 and the fixed flange of the wheel bearing unit 2. This reduces the transmission of forces due to the bolt preload, so that the flow of forces during braking is guided in a specific way from the first fastening openings 3 to the annular protrusions 6. More accurate measurement of forces is thus possible with the sensors 12.

Figure 3:
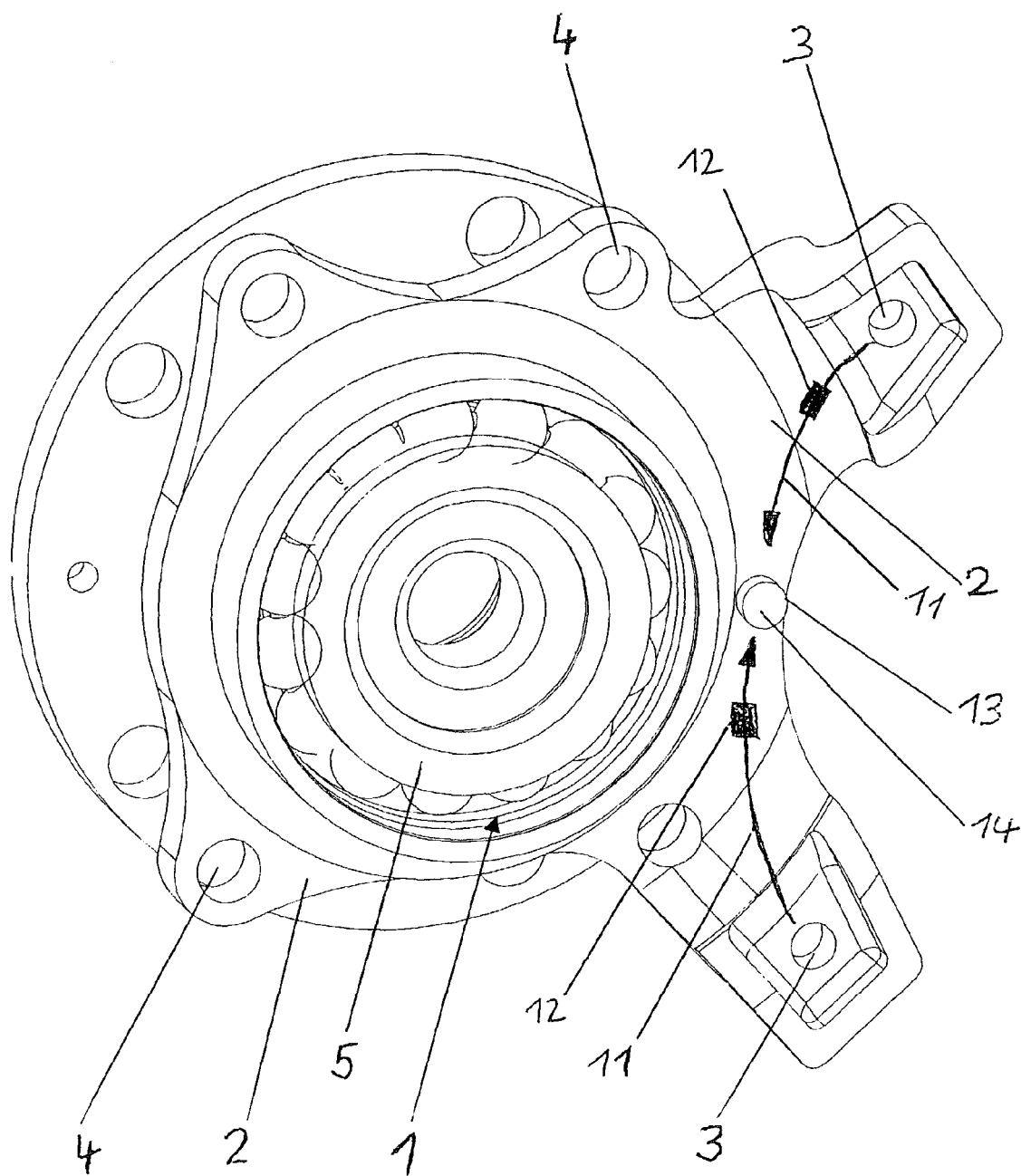
FIG. 3 shows the defined directions of force flow in the stationary flange of the wheel bearing

FIG. 3 shows a variant of FIG. 1. The sensors 12 are arranged on the lines of force flow between the brake caliper receptacle 3 and the form-locking element 13, 14.

The difference with respect to FIG. 1 is that an additional form-locking element 13, 14 is used to transmit the forces from the stationary flange 2 of the wheel bearing to the wheel carrier during braking. This form-locking element can be in the form of a pin 13 or a key 13. There is likewise the possibility of designing this element as a one-piece projection 14 on the stationary flange of the wheel bearing 2. The equivalent solution, which involves arranging the projection in the wheel carrier, is not shown.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A wheel bearing comprising:

a rotating part, a stationary flange and rolling contact elements arranged between the rotating part and the flange, the flange having first openings adapted to support a brake caliper;

at least one sensor so arranged and placed on the stationary flange for measuring the braking force by measur ing a change in length in the material of the stationary flange in the flow of force between the first fastening openings in the flange for receiving a brake caliper and a form-locking connecting element for connecting to a wheel carrier.

2. The wheel bearing unit of claim 1, further comprising a sliding layer between the wheel carrier and the fixed flange.

* * * * *